United States Patent
Igawa et al.

(10) Patent No.: US 10,823,601 B2
(45) Date of Patent: Nov. 3, 2020

(54) WATER LEVEL MEASURING SYSTEM, INFORMATION PROCESSING APPARATUS, AND WATER LEVEL MEASURING METHOD

(71) Applicant: TAIYO YUDEN CO., LTD., Tokyo (JP)

(72) Inventors: Izumi Igawa, Gunma (JP); Ryuichi Sunagawa, Gunma (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/726,121

(22) Filed: Dec. 23, 2019

(65) Prior Publication Data
US 2020/0209045 A1 Jul. 2, 2020

(30) Foreign Application Priority Data
Dec. 27, 2018 (JP) .................................. 2018-245522

(51) Int. Cl.
*G01F 23/284* (2006.01)
*G01S 13/08* (2006.01)
*G08B 21/18* (2006.01)
*G08B 25/00* (2006.01)

(52) U.S. Cl.
CPC ............ *G01F 23/284* (2013.01); *G01S 13/08* (2013.01); *G08B 21/182* (2013.01); *G08B 25/00* (2013.01)

(58) Field of Classification Search
None
See application file for complete search history.

(56) References Cited

U.S. PATENT DOCUMENTS

| | | | |
|---|---|---|---|
| 9,047,775 B2 * | 6/2015 | Claudel | G08G 1/0116 |
| 9,714,038 B1 * | 7/2017 | He | G01S 15/86 |
| 10,018,475 B2 * | 7/2018 | Hakeem | G01C 21/3415 |
| 10,452,072 B2 * | 10/2019 | Myers | G01C 13/008 |
| 2010/0112387 A1 * | 5/2010 | Nagasawa | H01M 8/04753 |
| | | | 429/413 |
| 2018/0312165 A1 * | 11/2018 | Dudar | G01C 21/3415 |

FOREIGN PATENT DOCUMENTS

| | | |
|---|---|---|
| JP | 2013-32999 A | 2/2013 |
| JP | 2004-325193 A | 11/2014 |

* cited by examiner

*Primary Examiner* — John F Mortell
(74) *Attorney, Agent, or Firm* — Chen Yoshimura LLP

(57) ABSTRACT

A water level measuring system includes a distance sensor, a disturbance detecting unit, and a computation unit. The distance sensor is provided above a road and configured to output a sensor signal that includes a signal component representing a distance to a road surface of the road or a distance to an object present on the road surface. The disturbance detecting unit is configured to detect, from the sensor signal, a disturbance part acquired in a period in which a moving body is passing below the distance sensor. The computation unit is configured to compute a water level of water flooding the road based on the sensor signal from which the disturbance part has been eliminated.

11 Claims, 8 Drawing Sheets

WATER LEVEL MEASURING SYSTEM, INFORMATION PROCESSING APPARATUS, AND WATER LEVEL MEASURING METHOD

CROSS-REFERENCE TO RELATED APPLICATIONS

This application is based upon and claims the benefit of priority from Japanese Patent Application No. 2018-245522, filed Dec. 27, 2018, the entire contents of which are incorporated herein by reference.

FIELD

Embodiments described in the present disclosure relate to a water level measuring system, an information processing apparatus, and a water level measuring method.

BACKGROUND

Conventionally, a system to detect a flood in a road has been known. There is a patent document (for example, Japanese Patent Application Publication No. 2004-325193) that describes a technique for detecting, with an electromagnetic wave sensor, the condition of a road surface and the depth of a flood during the flood. Another patent document (for example, Japanese Patent Application Publication No. 2013-32999) describes a technique for detecting, with a radar apparatus, whether a reflective plate provided on a road surface has been submerged.

Meanwhile, it is conceivable to provide a system to emit an electromagnetic wave signal from above the road toward a road surface of the road and measure the water level of water flooding a road based on a reflected wave. This kind of system has not been capable of measuring the water level with high accuracy because vehicles or the like reflect electromagnetic wave signals while passing on the road.

SUMMARY

An object of the present invention is to provide a water level measuring system, an information processing apparatus, and a water level measuring method, each being capable of accurately measuring the water level of water flooding a road.

A water level measuring system according to the present invention includes a distance sensor, a disturbance detecting unit, and a computation unit. The distance sensor is provided above a road and configured to output a sensor signal that includes a signal component representing a distance to a road surface of the road or a distance to an object present on the road surface. The disturbance detecting unit is configured to detect, from the sensor signal, a disturbance part acquired in a period in which a moving body is passing below the distance sensor. The computation unit is configured to compute a water level of water flooding the road based on the sensor signal from which the disturbance part has been eliminated.

DETAILED DESCRIPTION

A water level measuring system 10 according to an embodiment will be described. The water level measuring system 10 is capable of accurately measuring the water level of water flooding a road.

Figure 1:
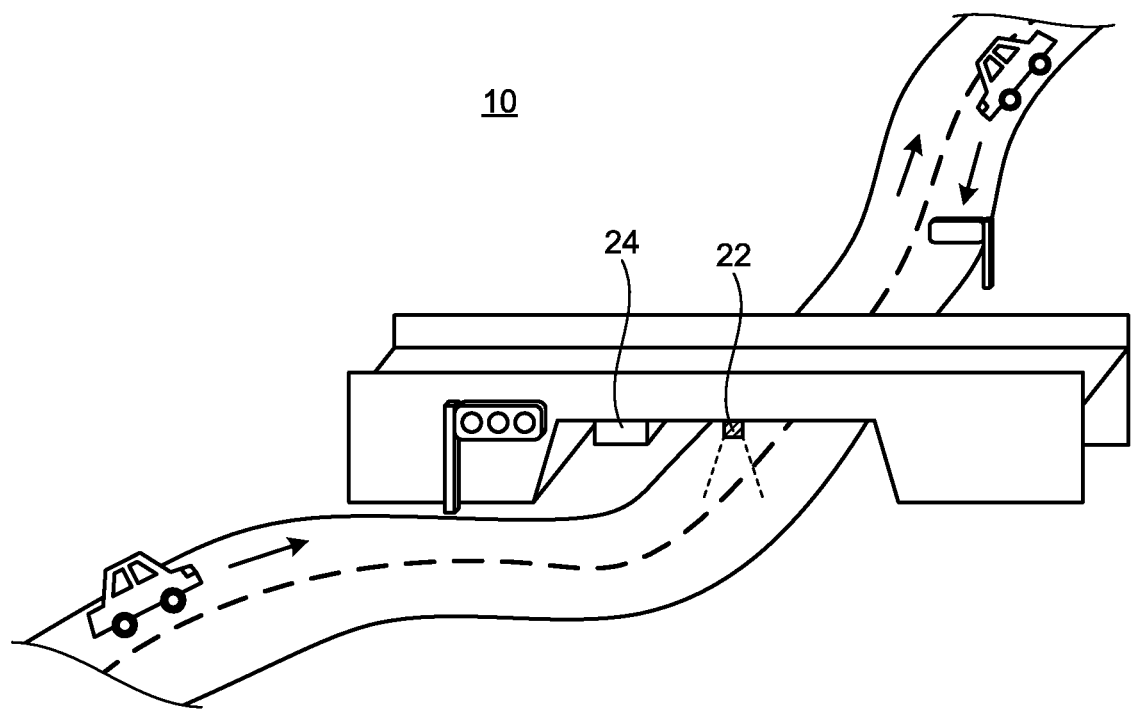
FIG. 1 is a diagram illustrating a water level measuring system according to an embodiment.

FIG. 1 illustrates the water level measuring system 10 according to the embodiment. The water level measuring system 10 includes a distance sensor 22 and an information processing apparatus 24.

The distance sensor 22 is provided above a road and outputs a sensor signal that includes a signal component representing a distance to a road surface of the road or a distance to an object present on the road surface. For example, the distance sensor 22 emits a signal downward (in a direction toward the road surface) from above the road and acquires a signal reflected by an object that is present below the distance sensor 22. Based on the reflected signal, the distance sensor 22 measures the distance between the distance sensor 22 and the object by which the emitted signal was reflected.

In the present embodiment, the distance sensor 22 measures the distance by emitting an electromagnetic wave signal of the millimeter-wave band in the direction toward the road surface and acquiring a reflected signal from the road surface or from an object present on the road surface. The distance sensor 22 emits an electromagnetic wave signal of, for example, the 5.8 GHz band, the 24 GHz band, or the 77 GHz band. The distance sensor 22 is not limited to a millimeter-wave sensor and may be a sensor using an electromagnetic wave signal in a frequency band other than the millimeter-wave band, a sensor using an ultrasound wave, a sensor using laser, a sensor using light, or the like. Any sensor capable of emitting a signal toward the road surface and capable of receiving a reflected signal from the road surface or an object present on the road surface is applicable as the distance sensor 22. Therefore, the position above the road at which the distance sensor 22 is provided is not limited to a position immediately above the road and may be within a range in which the distance sensor 22 is able to receive the reflected signal.

The information processing apparatus 24 is a computer or the like that executes computer programs. For example, the information processing apparatus 24 is contained in a housing and provided near the distance sensor 22. The information processing apparatus 24 may alternatively be provided at a position distant from the distance sensor 22 and acquire, via a network, a sensor signal output from the distance sensor 22.

The information processing apparatus 24 controls the distance sensor 22 and acquires the sensor signal output from the distance sensor 22. The information processing apparatus 24 computes the water level of water flooding the road based on the sensor signal. The information processing apparatus 24 transmits the computed water level via a network to a supervision apparatus for supervising the condition of the road and controlling traffic of vehicles traveling on the road. The information processing apparatus 24 determines whether the water level is higher than a predetermined alarming water level. When the water level becomes higher than the alarming water level, the information processing apparatus 24 outputs alarm information to the supervision apparatus and the like.

Figure 2:
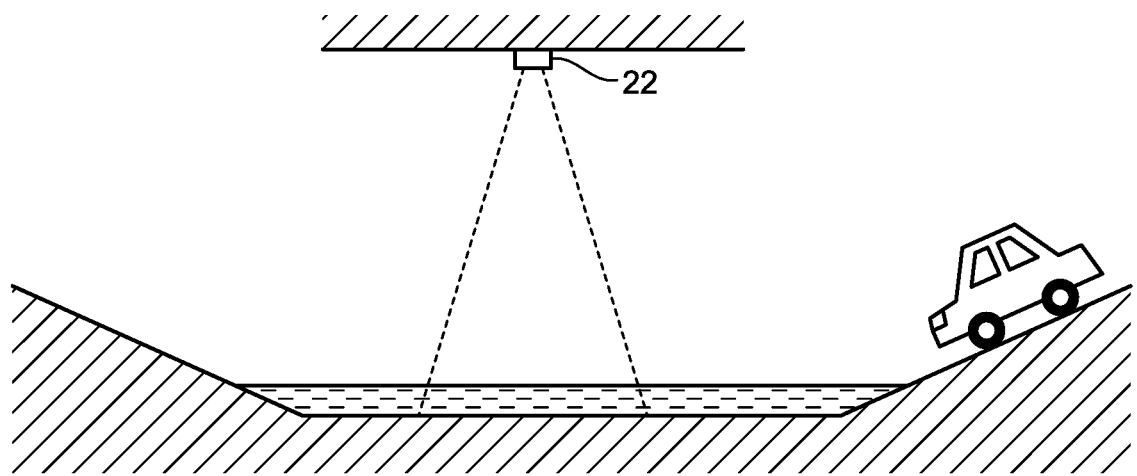
FIG. 2 is a diagram illustrating a position to which a distance sensor is attached.

FIG. 2 illustrates the position to which the distance sensor 22 is attached. The distance sensor 22 is provided above an area that is part of the road and is highly susceptible to flood. The dotted lines shown in FIG. 2, which extends from the distance sensor 22, represent an example of a detectable range of the distance sensor 22.

The distance sensor 22 may be attached to, for example, the ceiling of an underpass of the road or the ceiling of a tunnel. The distance sensor 22 outputs a sensor signal representing a distance between the ceiling and the surface of water flooding the road in the underpass or in the tunnel. The distance sensor 22 may alternatively be attached to, for example, a beam or the like that horizontally extends from a pole standing at the roadside toward the center of the road. The underpass refers to part of the road that is made by digging beneath the ground surface into a shape that goes under another road, a railroad track, or the like.

Note that, when a road is not flooded and an object, such as a vehicle, is not present below the distance sensor 22, the value of a sensor signal represents a distance between the distance sensor 22 and the road surface. When the road is flooded and such object is not present below the distance sensor 22, the value of the sensor signal represents a distance between the distance sensor 22 and the surface of water flooding the road. When such object is passing below the distance sensor 22, the value of the sensor signal represents a distance between the distance sensor 22 and the upper surface of the object.

Figure 3:
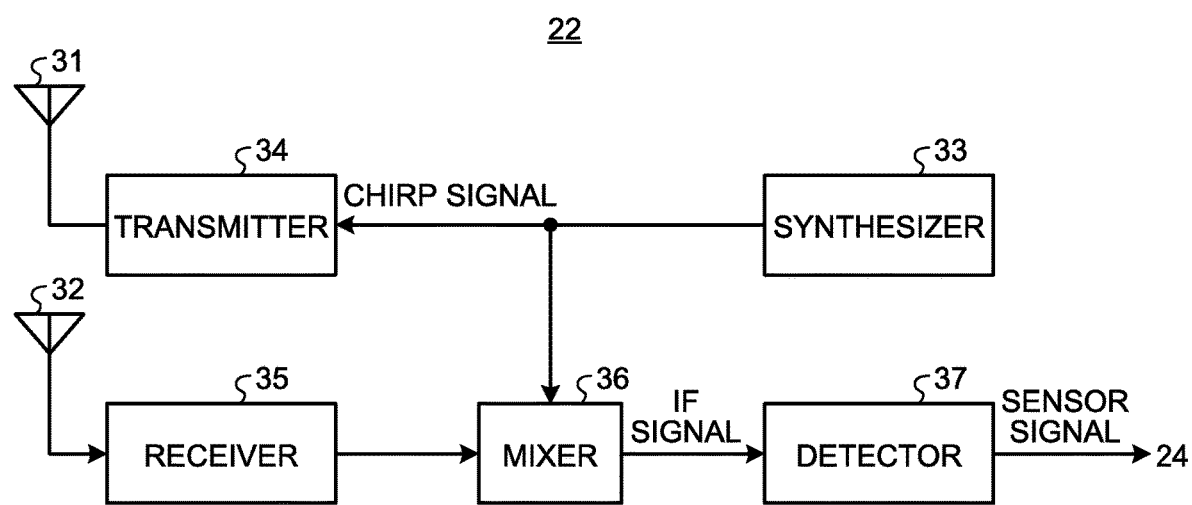
FIG. 3 is a diagram illustrating an example of a configuration of the distance sensor.

FIG. 3 illustrates an example of the configuration of the distance sensor 22. The distance sensor 22 includes, for example, a transmitter antenna 31, a receiver antenna 32, a synthesizer 33, a transmitter 34, a receiver 35, a mixer 36, and a detector 37.

The transmitter antenna 31 radiates an electromagnetic wave signal of the millimeter-wave band. The receiver antenna 32 receives the electromagnetic wave signal of the millimeter-wave band.

The synthesizer 33 generates a chirp signal whose frequency varies from a predetermined lower-limit frequency to a predetermined higher-limit frequency in the millimeter-wave band. The transmitter 34 amplifies the chirp signal and transmits the amplified chirp signal through the transmitter antenna 31. The chirp signal radiated from the transmitter antenna 31 is reflected by an object.

The receiver 35 amplifies an electromagnetic wave signal received through the receiver antenna 32. The mixer 36 acquires the chirp signal output from the synthesizer 33 and the received signal output from the receiver 35. The mixer 36 generates an intermediate frequency (IF) signal by multiplying the transmitted chirp signal and the received signal.

The detector 37 acquires the IF signal output from the mixer 36. The detector 37 then outputs a sensor signal having a level according to the frequency of the acquired IF signal. The sensor signal output from the detector 37 is given to the information processing apparatus 24.

Here, when a reflected signal obtained as a result of reflection of the chirp signal output from the transmitter antenna 31 is received by the receiver antenna 32, the frequency of the IF signal represents a value corresponding to a distance to an object that has reflected the chirp signal. Therefore, the distance sensor 22 can output a sensor signal representing the distance to the object that has reflected the chirp signal.

Figure 4:
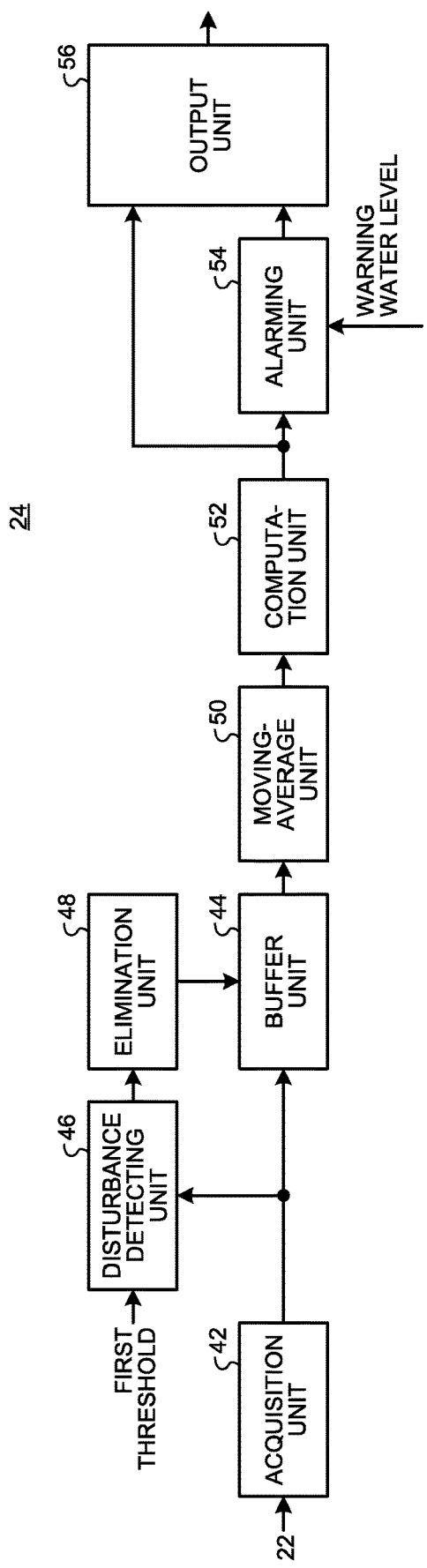
FIG. 4 is a diagram illustrating a functional configuration of an information processing apparatus.

FIG. 4 illustrates the functional configuration of the information processing apparatus 24. The information processing apparatus 24 includes an acquisition unit 42, a buffer unit 44, a disturbance detecting unit 46, an elimination unit 48, a moving-average unit 50, a computation unit 52, an alarming unit 54, and an output unit 56.

The acquisition unit 42 acquires the sensor signal output from the distance sensor 22 at regular intervals. For example, the acquisition unit 42 acquires, per a second of time, several to several tens of samples of the sensor signal output from the distance sensor 22. The acquisition unit 42 stores the acquired sensor signal in the buffer unit 44.

The buffer unit 44 stores the sensor signal for a certain period of time coming from the acquisition unit 42. Specifically, for example, the buffer unit 44 stores the samples of the sensor signal corresponding to one to two seconds of time.

The disturbance detecting unit 46 detects, from the sensor signal, a disturbance part acquired in a period in which a vehicle is passing below the distance sensor 22. Such period refers to a period in which the vehicle is passing through the detectable range of a signal of the distance sensor 22. In the present embodiment, a moving body is exemplified by a vehicle such as a passenger vehicle. In the present embodiment, a vehicle is an object that has wheels and travels on a road. The moving body in the present embodiment is not limited to a vehicle and may be any other object that travels on a road.

The disturbance detecting unit 46 analyzes the sensor signal acquired by the acquisition unit 42 and detects a front edge and a rear edge in the sensor signal. The front edge is a point where the sensor signal varies from a value larger than a predetermined first threshold to a value not larger than the first threshold. The rear edge is a point where the sensor signal varies from a value not larger than the first threshold to a value larger than the first threshold. Then, the disturbance detecting unit 46 detects, as the disturbance part, a range of the sensor signal including a part from the front edge to the rear edge that is initially present after the front edge. Alternatively, the disturbance detecting unit 46 may detect, as the disturbance part, part of the sensor signal corresponding to a period from a first timing to a second timing. The first timing is present before the front edge by a predetermined first margin. The second timing is present after the rear edge by a predetermined second margin period.

The elimination unit 48 eliminates, from the samples of the sensor signal, the disturbance part detected by the disturbance detecting unit 46. In the present embodiment, the elimination unit 48 eliminates, from the sensor signal stored in the buffer unit 44, the disturbance part detected by the disturbance detecting unit 46.

The moving-average unit 50 generates a moving-average signal by taking moving averages on the sensor signal from which the disturbance part has been eliminated. The moving-average unit 50 computes moving averages of the samples of the sensor signal, each corresponding to, for example, 5 to 10 seconds of time.

Based on the moving-average signal output from the moving-average unit 50, the computation unit 52 computes the water level of water flooding the road surface of the road. That is, based on the sensor signal from which the disturbance part has been eliminated, the computation unit 52 computes the water level of water flooding the road. Specifically, the computation unit 52 computes the water level of the water by, for example, subtracting the value of the sensor signal from a value corresponding to the distance between a position to which the distance sensor 22 is attached and the road surface of the road.

The alarming unit 54 compares the water level computed by the computation unit 52 with the predetermined alarming water level. When the computed water level becomes higher than the predetermined alarming water level, the alarming unit 54 outputs alarm information.

The output unit 56 transmits the water level computed by the computation unit 52 to the supervision apparatus via a network. The supervision apparatus is, for example, a server that supervises the condition of the road and controlling traffic of vehicles traveling on the road. The supervision apparatus displays the water level acquired by the information processing apparatus 24 on a monitor or the like, thereby presenting the acquired water level to a supervisor.

When the alarm information is output by the alarming unit 54, the output unit 56 transmits the alarm information to the supervision apparatus via the network. Upon receiving the alarm information, the supervision apparatus performs, for example, control of traffic lights or indication control in order to prohibit entry to the road above which the distance sensor 22 is provided.

Figure 5:
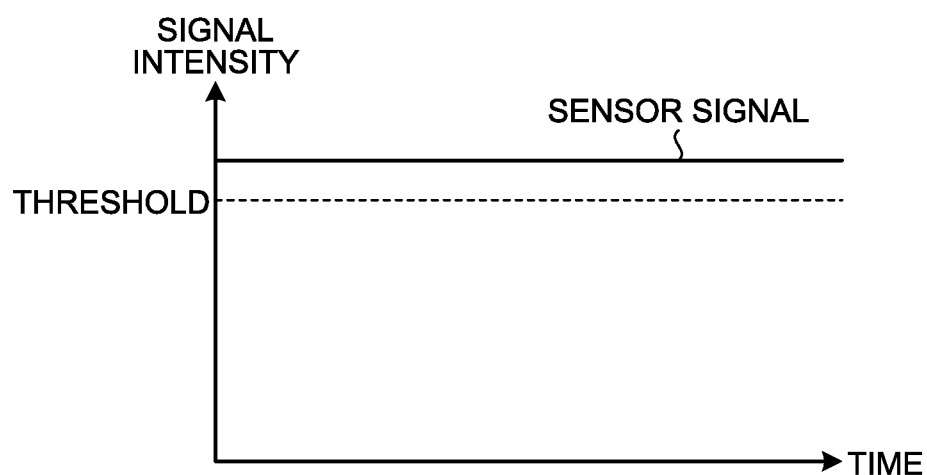
FIG. 5 is a diagram illustrating a schematic waveform of a sensor signal, from which noise has been eliminated, under normal conditions.

FIG. 5 illustrates a schematic waveform of a sensor signal, from which noise has been eliminated, under normal conditions. Under the normal conditions, that is, when a road is not flooded and no vehicles travel on the road, the sensor signal indicates a value corresponding to the distance between the distance sensor 22 and the road surface of the road.

The alarming water level is set to a water level lower than a water level that makes it impossible for a vehicle to pass. For example, the alarming water level may be set to a height corresponding to the radius of a tire of a passenger vehicle (for instance, about 30 cm).

The distance sensor 22 is provided above the road surface of the road. Thus, the value of the sensor signal becomes smaller as the water level of water flooding the road surface is higher. Under the normal conditions, the sensor signal indicates a larger value than a value that represents a distance corresponding to the alarming water level, as illustrated in FIG. 5.

Figure 6:
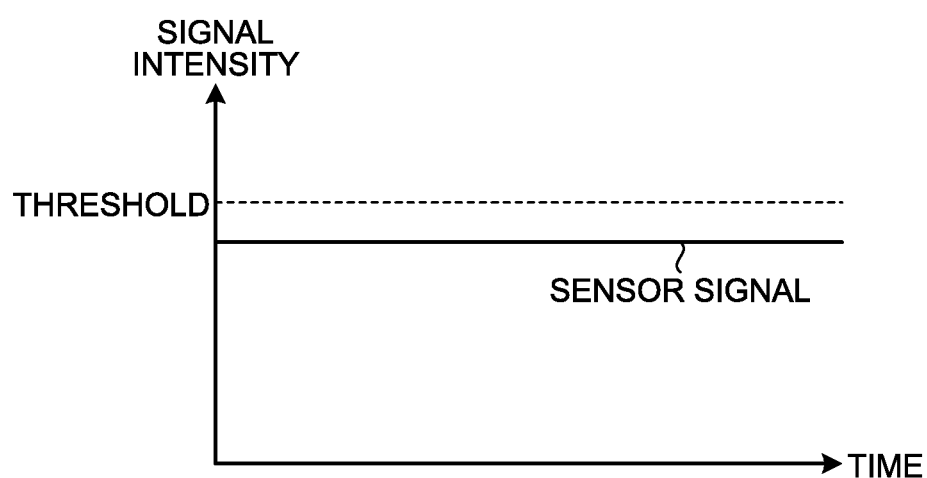
FIG. 6 is a diagram illustrating a schematic waveform of a sensor signal, from which noise has been eliminated, in a case where water extremely swells.

FIG. 6 illustrates a schematic waveform of the sensor signal, from which noise has been eliminated, in a case where water extremely swells. At the time of flooding, the sensor signal indicates a value corresponding to the distance between the distance sensor 22 and the surface of water flooding the alarming water level.

When water having risen, the water level of water flooding the road rises to a degree that makes it impossible for vehicles to travel on the road. Thus, in the case where water extremely swells, the sensor signal becomes smaller than a value that represents a distance corresponding to the alarming water level.

Figure 7:
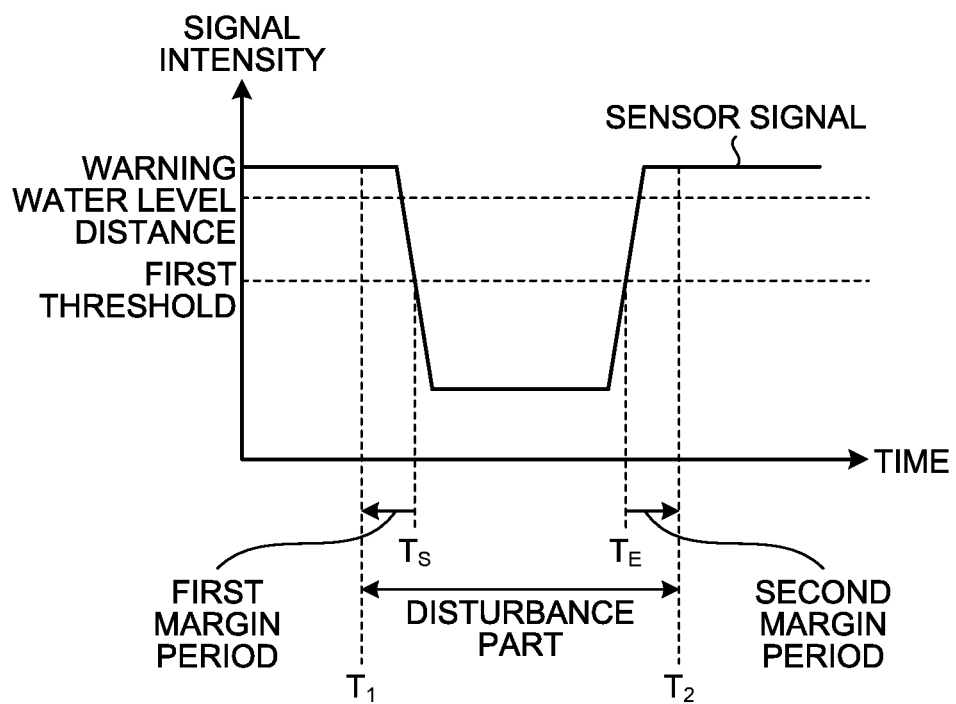
FIG. 7 is a diagram illustrating a schematic waveform of a sensor signal, from which noise has been eliminated, in a case where a vehicle passes below the distance sensor.

FIG. 7 illustrates a schematic waveform of the sensor signal, from which noise has been eliminated, in a case where a vehicle passes below the distance sensor 22.

When a vehicle passes immediately below the distance sensor 22, a signal (for example, an electromagnetic wave signal) emitted from the distance sensor 22 is reflected by the vehicle back to the distance sensor 22. Thus, when there is a vehicle passing immediately below the distance sensor 22, the sensor signal indicates a value corresponding to the distance between the distance sensor 22 and the vehicle. In this case, the sensor signal becomes smaller than a value that represents a distance corresponding to the alarming water level.

The disturbance detecting unit 46 is provided with the first threshold. The first threshold is a value of the sensor signal corresponding to a distance between the distance sensor 22 and a position that is higher than the alarming water level and lower than the upper surface of a vehicle. The first threshold is predetermined by the supervisor or the like.

The disturbance detecting unit 46 analyzes the sensor signal and detects the front edge ($T_S$) and the rear edge ($T_E$) in the sensor signal. The front edge ($T_S$) is a point where the sensor signal varies from a value larger than a predetermined first threshold to a value not larger than the first threshold. The rear edge ($T_E$) is a point where the sensor signal varies from a value not larger than the first threshold to a value larger than the first threshold.

Furthermore, the disturbance detecting unit 46 detects the first timing ($T_1$), which is present before the front edge ($T_S$) by the predetermined first margin period. The disturbance detecting unit 46 also detects the second timing ($T_2$), which is present after the rear edge by the predetermined second margin period. The disturbance detecting unit 46 then detects, as the disturbance part, part of the sensor signal corresponding to a period from the first timing ($T_1$) to the second timing ($T_2$).

The elimination unit 48 eliminates, from the sensor signal, the disturbance part detected through the foregoing process. Based on the sensor signal from which the disturbance part has been eliminated, the computation unit 52 computes the water level of water flooding the road.

By performing the above-described processing, the information processing apparatus 24 is able to compute the water level of water flooding the road based on the sensor signal from which a disturbance caused by traffic of a moving body such as the vehicle. Therefore, the information processing apparatus 24 is capable of highly accurately computing the water level of water flooding a road.

Furthermore, the information processing apparatus 24 recognizes, as being included in the disturbance part, part of the sensor signal in the first margin period back from the front edge ($T_S$) and part of the sensor signal in the second margin period starting from the rear edge and then eliminates those parts from the sensor signal. Thus, the information processing apparatus 24 is capable of eliminating errors caused by such factors as movement of the water surface due to passage of vehicles. Therefore, the information processing apparatus 24 is capable of more accurately computing the water level of water flooding a road.

Figure 8:
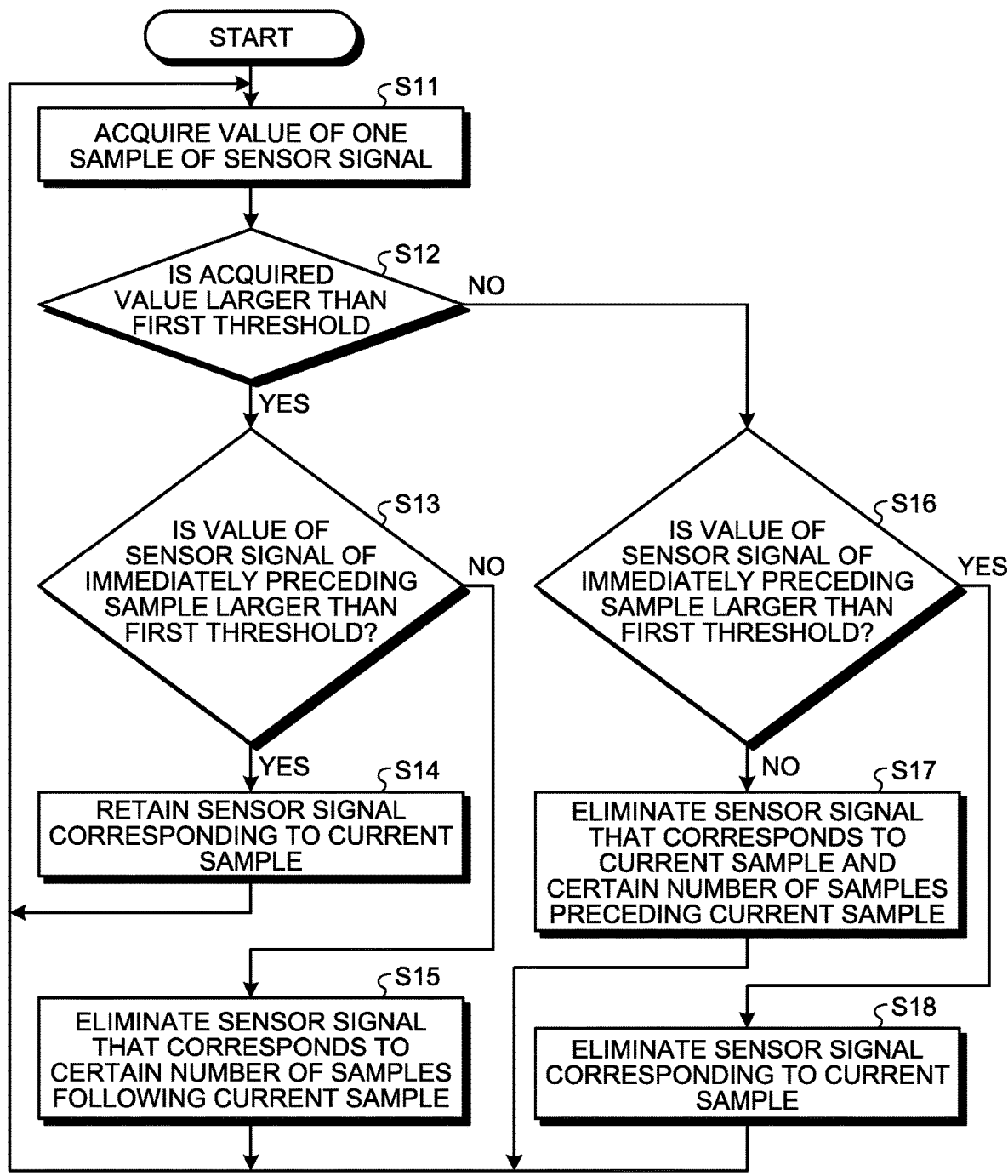
FIG. 8 is a diagram illustrating an example of the procedure of processing to be performed by the information processing apparatus.

FIG. 8 illustrates an example of the procedure of processing to be performed by the information processing apparatus 24. The disturbance detecting unit 46 and the elimination unit 48 of the information processing apparatus 24 perform processing illustrated in FIG. 8 for each individual sample of the sensor signal.

At S11, the disturbance detecting unit 46 acquires a value of one sample of the sensor signal. Subsequently, at S12, the disturbance detecting unit 46 determines whether the acquired value of the sensor signal is larger than the predetermined first threshold. When the acquired value of the sensor signal is larger than the first threshold (Yes at S12), the disturbance detecting unit 46 shifts the processing to S13. When the acquired value of the sensor signal is not larger than the first threshold (No at S12), the disturbance detecting unit 46 shifts the processing to S16.

At S13, the disturbance detecting unit 46 determines whether a value of the sensor signal of an immediately preceding sample is larger than the first threshold. When the value of the immediately preceding sample is larger than the first threshold (Yes at S13), the disturbance detecting unit 46 shifts the processing to S14. When the value of the immediately preceding sample is not larger than the first threshold (No at S13), the disturbance detecting unit 46 shifts the processing to S15.

At S14, the elimination unit 48 determines that the currently acquired sample of the sensor signal does not correspond to the disturbance part. In this case, the currently acquired sample of the sensor signal is not eliminated but is retained. The elimination unit 48 stores the currently acquired sample of the sensor signal in the buffer unit 44.

At S15, the elimination unit 48 determines that the currently acquired sample of the sensor signal corresponds to the rear edge. In this case, the elimination unit 48 eliminates part to the sensor signal in a range from the currently acquired sample to a certain number of samples following the currently acquired sample, which corresponds to the second margin period. That is, the elimination unit 48 eliminates, from the buffer unit 44, data of the sensor signal corresponding to the certain number of samples following the currently acquired sample.

At S16, the disturbance detecting unit 46 determines whether a value of the sensor signal of an immediately preceding sample is larger than the first threshold. When the value of the immediately preceding sample is not larger than the first threshold (No at S16), the disturbance detecting unit 46 shifts the processing to S17. When the value of the immediately preceding sample is larger than the first threshold (Yes at S16), the disturbance detecting unit 46 shifts the processing to S18.

At S17, the elimination unit 48 determines that the currently acquired sample of the sensor signal corresponds to the front edge. In this case, the elimination unit 48 eliminates part of the sensor signal in a range from a certain number of samples preceding the currently acquired sample, which corresponds to the first margin period, to the currently acquired sample. The elimination unit 48 eliminates, from the buffer unit 44, data of the sensor signal corresponding to the range from the certain number of samples preceding the currently acquired sample, which corresponds to the first margin period, to the currently acquired sample.

At S18, the elimination unit 48 determines that the currently acquired sample of the sensor signal corresponds to the disturbance part and thus eliminates part of the sensor signal corresponding to the currently acquired sample. That is, the elimination unit 48 deletes the currently acquired sample of the sensor signal from the buffer unit 44.

Upon completing the processing at S14, S15, S17, or S18, the elimination unit 48 returns the processing to S11. At S11, the disturbance detecting unit 46 acquires a value of a subsequent sample of the sensor signal and repeats the processing after S12.

By performing the above-described processing, the disturbance detecting unit 46 can detect, as the disturbance part in the sensor signal, samples corresponding to a period from the first timing, which is the first margin period before the front edge, to the second timing, which is the second margin period after the rear edge. The elimination unit 48 can eliminate the detected disturbance part from the sensor signal.

Figure 9:
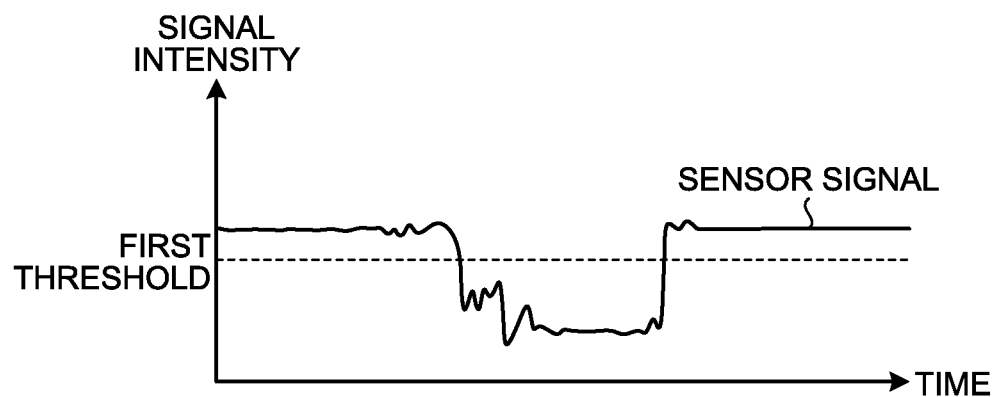
FIG. 9 is a diagram illustrating an example of the waveform of the sensor signal acquired when a one-box type light passenger vehicle (or a minivan type kei car) passes below the distance sensor.
Figure 10:
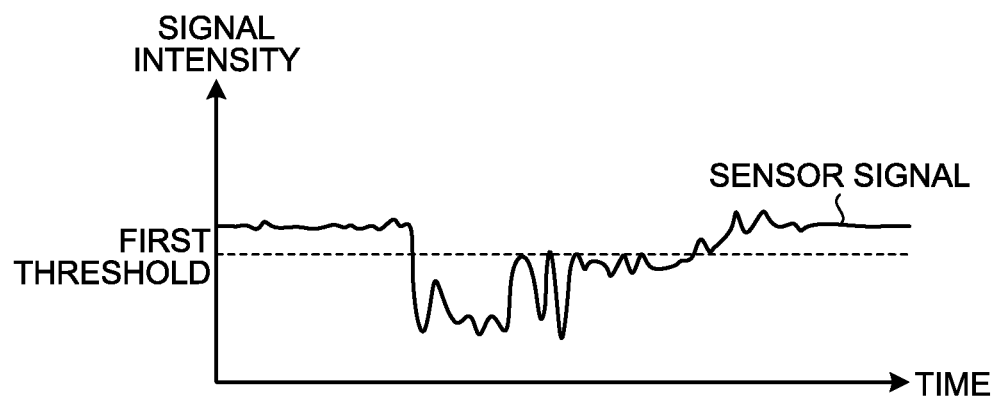
FIG. 10 is a diagram illustrating an example of the waveform of the sensor signal acquired when a light truck, whose carrier is not covered with a hood, passes below the distance sensor.

FIG. 9 illustrates an example of the waveform of the sensor signal acquired when a one-box type light passenger vehicle (or a minivan type kei car) passes below the distance sensor 22. FIG. 10 illustrates an example of the waveform of the sensor signal acquired when a light truck, whose carrier is not covered with a hood, passes below the distance sensor 22.

When the one-box type light passenger vehicle passes, the waveform of the sensor signal has a sharp fall and a rise at the front edge and the rear edge, and comparatively has low values for the entire period during which the vehicle is passing, as illustrated in FIG. 9. This is because the one-box type light passenger vehicle is formed in a rectangular parallelepiped and has a high ceiling, so that a distance between the high ceiling and the distance sensor 22 becomes short.

On the other hand, when the light truck without a hood over the carrier passes, the waveform of the sensor signal has a sharp fall at the front edge, whereas has a gentle rise at around the rear edge and has larger values at the rear side of the vehicle, as illustrated in FIG. 10. This is because the carrier of such light truck is at a relatively low position, so that a distance between the carrier and the distance sensor 22 becomes long.

Whenever any vehicle passes under the distance sensor 22, the first threshold is preferably set in advance to a value that enables the disturbance detecting unit 46 to detect, as the disturbance part, part of the sensor signal generated based on the reflected signal from such vehicle. For example, the value as the first threshold may be smaller than a value indicating a distance corresponding to the alarming water level and be larger than a value corresponding to a distance to a carrier of a light truck.

When the alarming water level is set to 30 cm from the road surface, the first threshold is preferably set to, for example, a value corresponding to a distance to a position about 80 cm from the road surface. The alarming water level and the first threshold are not limited to the above-exemplified values and may be set to any other values satisfying the condition that a position corresponding to the first threshold is higher than a position of the alarming water level from the road surface.

As described above, the water level measuring system 10 according to the embodiment is capable of computing the water level of water flooding the road based on the sensor signal from which a disturbance caused by passage of a moving body has been eliminated. Consequently, the water level measuring system 10 according to the embodiment can accurately computes the water level of water flooding a road.

Figure 11:
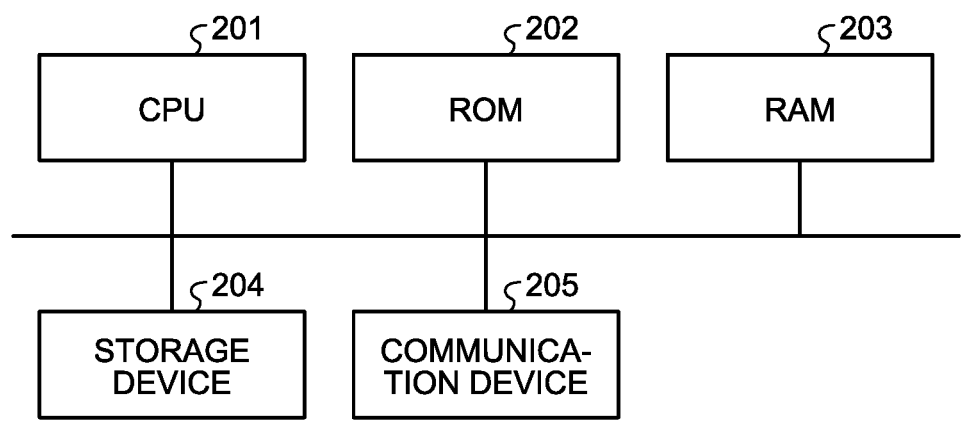
FIG. 11 is a diagram illustrating a hardware configuration of the information processing apparatus.

FIG. 11 illustrates the hardware configuration of the information processing apparatus 24. The information processing apparatus 24 has the same configuration as a typical computer. That is, the information processing apparatus 24 includes a central processing unit (CPU) 201, a read only memory (ROM) 202, a random access memory (RAM) 203, a storage device 204, and a communication device 205. The CPU 201, the ROM 202, the RAM 203, the storage device 204, and the communication device 205 are connected to one another by a bus.

The CPU 201 executes a computer program stored in the storage device 204 after loading the computer program onto the RAM 203 and thereby controls the individual units to perform input and output or process data. The ROM 202 has a start-up program stored therein that reads out, from the storage device 204 onto the RAM 203, a computer program for starting up an operating system.

The storage device 204 is, for example, a hard disk drive or a flash memory. The storage device 204 has the operating system, application programs, and data stored thereon. Such computer programs are recorded in the form of installable or executable files into computer-readable media and distributed. Such computer programs may be distributed by being downloaded from a server. The communication device 205 is, for example, an interface device for connection with a network.

A computer program that is executed on the information processing apparatus 24 according to the present embodiment is recorded in the form of an installable or executable file into a computer-readable medium such as a compact disc read-only memory (CD-ROM), a flexible disk (FD), a compact disc recordable (CD-R), or a digital versatile disc (DVD) and provided.

A computer program that is executed on the information processing apparatus 24 according to the present embodiment may alternatively be configured to be provided by being downloaded via a network such as the Internet after being recorded on a computer connected to the network. A computer program that is executed on the information processing apparatus 24 according to the present embodiment may alternatively be configured to be provided or distributed via a network such as the Internet. A computer program according to the present embodiment may alternatively be configured to be provided by being embedded in the ROM 202 or the like.

The computer program that is executed by the information processing apparatus 24 is composed of modules including an acquisition module, a disturbance detecting module, an elimination module, a moving-average module, a computation module, an alarming module, and an output module. In terms of practical hardware, the individual modules constituting the information processing apparatus 24 are loaded onto a main memory (the RAM 203) when a processor (the CPU 201) reads out a computer program from a storage medium (such as the storage device 204) and executes the computer program. Consequently, the processor (CPU 201) functions as the acquisition unit 42, the disturbance detecting unit 46, the elimination unit 48, the moving-average unit 50, the computation unit 52, the alarming unit 54, and the output unit 56. The storage device 204 or the RAM 203 functions as the buffer unit 44. In the information processing apparatus 24, part of or all the acquisition unit 42, the disturbance detecting unit 46, the elimination unit 48, the moving-average unit 50, the computation unit 52, the alarming unit 54, and the output unit 56 may be implemented in the form of hardware.

While certain embodiments have been described, those embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A water level measuring system comprising:
   a distance sensor that is provided above a road and configured to output a sensor signal that includes a signal component representing a distance to a road surface of the road or a distance to an object present on the road surface;
   a disturbance detecting unit configured to detect, from the sensor signal, a disturbance part acquired in a period in which a moving body is passing below the distance sensor; and
   a computation unit configured to compute a water level of water flooding the road based on the sensor signal from which the disturbance part has been eliminated.

2. The water level measuring system according to claim 1, wherein the disturbance detecting unit is configured to:
   detect a front edge and a rear edge in the sensor signal, the front edge being a point where the sensor signal varies from a value larger than a predetermined first threshold to a value not larger than the first threshold, the rear edge being a point where the sensor signal varies from a value not larger than the first threshold to a value larger than the first threshold; and
   detect, as the disturbance part, a range of the sensor signal including a part from the front edge to the rear edge that is initially present after the front edge.

3. The water level measuring system according to claim 2, wherein the disturbance detecting unit is configured to detect, as the disturbance part, part of the sensor signal corresponding to a period from a first timing to a second timing, the first timing being present before the front edge by a predetermined first margin period, the second timing being present after the rear edge by a predetermined second margin period.

4. The water level measuring system according to claim 2, further comprising an alarming unit configured to output alarm information when the computed water level becomes higher than a predetermined alarming water level.

5. The water level measuring system according to claim 4, wherein the first threshold represents a distance to a position higher than the alarming water level.

6. The water level measuring system according to claim 1, further comprising a moving-average unit configured to generate a moving-average signal by taking moving averages on the sensor signal from which the disturbance part has been eliminated,
   wherein the computation unit is configured to compute the water level based on the moving-average signal.

7. The water level measuring system according to claim 1, wherein the moving body is a vehicle.

8. The water level measuring system according to claim 1, wherein the distance sensor is configured to measure the distance to the road surface or the distance to the object by outputting an electromagnetic wave and receiving the electromagnetic wave reflected by the road surface or the object.

9. The water level measuring system according to claim 8, wherein the distance sensor is provided above the road in an underpass or a tunnel and outputs the sensor signal representing a distance between the distance sensor and a surface of water flooding the road in the underpass or in the tunnel.

10. An information processing apparatus comprising:
    an acquisition unit configured to acquire a sensor signal from a distance sensor provided above a road, the sensor signal including a signal component representing a distance to a road surface of the road or a distance to an object present on the road surface;

a disturbance detecting unit configured to detect, from the sensor signal, a disturbance part acquired in a period in which a moving body is passing below the distance sensor; and a computation unit configured to compute a water level of water flooding the road based on the sensor signal from which the disturbance part has been eliminated.

11. A water level measuring method implemented by a computer, the method comprising:

acquiring a sensor signal from a distance sensor provided above a road, the sensor signal including a signal component representing a distance to a road surface of the road or a distance to an object present on the road surface;

detecting, from the sensor signal, a disturbance part acquired in a period in which a moving body is passing below the distance sensor; and computing a water level of water flooding the road based on the sensor signal from which the disturbance part has been eliminated.

\* \* \* \* \*